(12) United States Patent
Bernat

(10) Patent No.: US 11,880,710 B2
(45) Date of Patent: Jan. 23, 2024

(54) ADAPTIVE DATA SHIPMENT BASED ON BURDEN FUNCTIONS

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 16/776,212

(22) Filed: Jan. 29, 2020

(65) Prior Publication Data
US 2020/0167190 A1   May 28, 2020

(51) Int. Cl.
G06F 9/48   (2006.01)
G06F 9/50   (2006.01)

(52) U.S. Cl.
CPC .......... *G06F 9/4881* (2013.01); *G06F 9/5038* (2013.01)

(58) Field of Classification Search
CPC .............................. G06F 9/4881; G06F 9/5038
See application file for complete search history.

(56) References Cited

U.S. PATENT DOCUMENTS

| 9,769,084 B2 * | 9/2017 | Udupi | H04L 47/78 |
| 2013/0124669 A1 * | 5/2013 | Anderson | G06F 11/301 |
| | | | 709/224 |

* cited by examiner

*Primary Examiner* — Wissam Rashid
(74) *Attorney, Agent, or Firm* — Alliance IP, LLC

(57) ABSTRACT

An apparatus comprising an interface to receive an identification of a function to be executed; and a scheduling engine comprising circuitry, the scheduling engine to select a candidate compute element from a plurality of candidate compute elements based on a combined burden, the combined burden based on an estimated burden to execute the function by the candidate compute element and an estimated burden of data movement over at least one interconnect identified for the candidate compute element.

20 Claims, 9 Drawing Sheets

402 — RECEIVING AN IDENTIFICATION OF A FUNCTION TO BE EXECUTED

404 — SELECTING A CANDIDATE COMPUTE ELEMENT FROM A PLURALITY OF CANDIDATE COMPUTE ELEMENTS BASED ON A COMBINED BURDEN, THE COMBINED BURDEN BASED ON AN ESTIMATED BURDEN TO EXECUTE THE FUNCTION BY A CANDIDATE COMPUTE ELEMENT AND AN ESTIMATED BURDEN OF DATA MOVEMENT OVER AT LEAST ONE INTERCONNECT IDENTIFIED FOR THE CANDIDATE COMPUTE ELEMENT

ADAPTIVE DATA SHIPMENT BASED ON BURDEN FUNCTIONS

BACKGROUND

A computing infrastructure may include one or more platforms each comprising at least one processor and associated memory modules. Each platform of the computing infrastructure may facilitate the performance of any suitable number of functions associated with various applications running on the platform or coupled to the platform. These functions may be performed by the processors and other associated logic of the platforms.

BRIEF DESCRIPTION OF THE DRAWINGS

Like reference numbers and designations in the various drawings indicate like elements.

DETAILED DESCRIPTION

Figure 1:
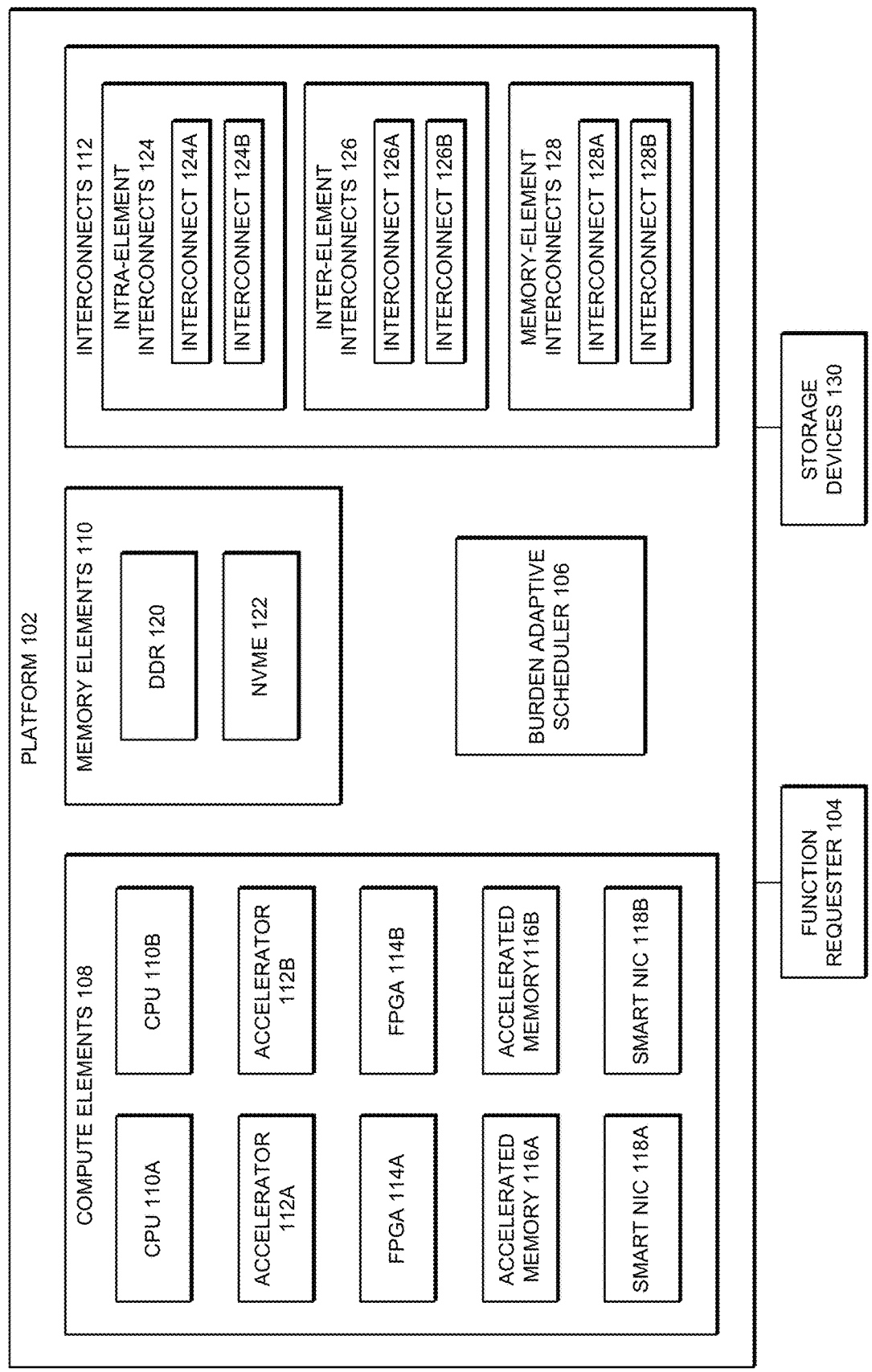
FIG. 1 illustrates a computing system in accordance with certain embodiments.

FIG. 1 illustrates a block diagram of components of a computing infrastructure 100 in accordance with certain embodiments. In the embodiment depicted, computing infrastructure 100 includes a platform 102 and a function requester 104 that interacts with the platform 102. Platform 102 includes a burden adaptive scheduler 106 that receives requests from function requester 104 and assigns compute and data transfer resources for the requests based on one or more burden functions. Scheduler 106 may select resources from among compute elements 108 and interconnects 112. Platform 102 also includes memory elements 110 for storing data that may be, e.g., inputs or outputs of the requests. In various embodiments, platform 102 may service requests from many different function requesters 104.

In various embodiments, computing infrastructure 100 may represent any suitable combination of compute hosts (e.g., platforms 102) comprising various physical elements. For example, computing infrastructure 100 may comprise a datacenter, a communications service provider infrastructure (e.g., one or more portions of an Evolved Packet Core or 5G Core Network), an infrastructure of a cloud service provider, a corporate network, or other suitable computing infrastructure comprising a group of compute hosts.

A computing platform may include many different types of platform compute elements and transport technologies. For example, in the embodiment depicted, platform 102 includes compute elements 108, including processors 110A and 110B, accelerators 112A and 112B, field programmable gate arrays (FPGAs) 114A and 114B, accelerated memories 116A and 116B, and smart network interface controllers (NICs) 118A and 118B; as well as interconnects 112 including intra-element interconnects 124, inter-element interconnects 126, and memory-element interconnects 128. The ability of a platform to support diverse hardware may enable flexible and powerful architectures to execute a variety of workloads and functions.

Some computing environments may support a function as a service model, where instead of having a single large application that processes a workload, the workload is divided into smaller segments and each segment executes a function. In such environments, data may traverse from function to function and the functions may be performed in different components of the platform. For example, a first function may be performed by a core of a processor, a second function may utilize the result of the first function and be executed by a different component of the platform, such as an FPGA, and so on.

In some situations, a particular function may be executable by multiple different types of compute elements of the platform, such as cores, FPGAs, or accelerators or multiple instances of a particular type of compute element. In particular embodiments, the compute element that executes a particular function (when multiple compute elements have the ability to execute that function) may be selected based on various criteria such as performance, power usage, or other criteria. For instance, a function requester, such as a service, may prefer to execute a crypto function in less than 4 ms while another service may prefer that the crypto function be executed in less than 15 ms but may desire execution at a lower burden. In general, there are two critical aspects to consider in order to decide where to execute a function: the utilization of the compute element (e.g., a core may be able to satisfy a 4 ms execution requirement when the core is at a medium utilization but only meet a 6 ms execution time when the core is at a high utilization) and the burden of moving data to be processed from a memory element to a particular compute element to perform the function execution. The burden to move data may depend on the amount of data to be moved (e.g., the burden is not the same to move 1 KB of data and 10 MB of data) and the status of the several interconnects that the data has to traverse from the storage media to the compute element. The burden of moving data becomes even more relevant as storage media technologies now may include acceleration capabilities (thus reducing the burden of data movement).

In some systems, selection of compute elements may be implemented by a software based solution. For example, different function providers may use a Kafka framework to select functions and data payload to be processed, which may be stored in a data base, filesystem, or object repository. Other systems may utilize hardware elements that consider function allocation based on resource utilization. In such cases, resource utilization and other metrics (such as power) may be used to perform the function allocation. However, metrics and resource selection actions may be focused on resource utilization and where to run functions but fail to consider the impact of moving the data to be processed which can exceed the compute time in some instances depending on the interconnects to be crossed, the amount of data to be transferred, and utilization of the interconnects. Moreover, in granular execution domains (where the functions to be executed are relatively small) a software based approach may not react with the time needed given the software overhead.

Various embodiments of the present disclosure utilize a burden adaptive scheduler 106 comprising hardware logic to dynamically determine the optimal compute elements 108 to perform functions based on one or more burden functions that consider both data movement and compute burdens. In some embodiments, instead of selecting a current instance of a function of a compute element to perform a request, the burden adaptive scheduler 106 may determine to instantiate a new instance of the function on a compute element that does not have an instance of the function and select that compute element to perform the request. In various embodiments, the burden function may be termed a service data plus execution (SPDE) burden function and may be based on the capabilities and status of one or more available instances of the functions in the platform as well the dynamic burden of moving the input data from where it is stored to the functions available and moving the output data from the functions to the destination. In various embodiments, the SPDE burden function is based on current utilization and capacity of each of the interconnects that data would traverse. In some embodiments, the SPDE burden function is based on a service level agreement (e.g., a maximum execution latency) required by the function requester (e.g., service or workload).

As one example, a platform may expose access to a crypto function A in an accelerator, an FPGA, and an accelerated memory (in which the data resides). When a function requester requests access to the function for a payload N, the burden adaptive scheduler 106 may determine based on a burden function whether to perform function A: (1) by the accelerator at performance X with data movement burden Z, (2) by the FPGA at performance 2X at 2Z data movement burden, or (3) by the accelerated memory at performance 4X with no data movement burden.

Various embodiments of the present disclosure may provide one or more technical advantages, such as improving the ability to consume resources of a platform; making the platform more adaptive to dynamic scenarios with granular execution requirements; or providing increased scalability and improved total cost of ownership due to the ability to dynamically optimize movement of data resources and usage of compute elements.

Platform 102 may include any suitable compute elements, such as processors 110, accelerators 112, FPGAs 114, accelerated memories 116, and smart NICs 118. Although particular compute elements are shown, a platform 102 may include any suitable number of compute elements or any types of compute element that includes circuitry to execute functions requested by a function requester (e.g., 104).

Processors 110 may each include one or more processor cores or other processing units. Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; and 3) a special purpose core intended primarily for graphics and/or scientific (throughput) computing. As examples, implementations of different processors may include, e.g.,: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for a particular types of functions such as graphics and/or scientific (throughput) (e.g., a graphics processing unit (GPU)).

In some embodiments, the cores themselves may be considered compute elements by the burden adaptive scheduler 106 (thus the schedule 106 may select a particular core to execute a function, as opposed to a particular processor (e.g., CPU)). In other embodiments, a processor with multiple cores may be considered together as a single compute element.

An accelerator 112 may include any suitable accelerator, such as a digital signal processor, a graphics accelerator, a network processor, a cryptographic accelerator, an artificial intelligence accelerator (e.g., vision processing unit, neuromorphic processor, etc.), a tensor processing unit, web accelerator, machine learning accelerator, or other suitable collection of circuitry to perform specialized functions.

An FPGA 114 may comprise a semiconductor device that includes configurable logic. An FPGA 114 may be programmed via a data structure (e.g., a bitstream) having any suitable format that defines how the logic of the FPGA is to be configured. An FPGA 114 may be reprogrammed any number of times after the FPGA is manufactured. The configurable logic of an FPGA may include any suitable logic, such as any suitable type of logic gates (e.g., AND gates, XOR gates) or combinations of logic gates (e.g., flip flops, look up tables, adders, multipliers, multiplexers, demultiplexers). In some embodiments, the logic is configured (at least in part) through programmable interconnects between logic components of the FPGA.

An accelerated memory 116 may comprise a memory device that includes processing abilities enabling the memory device to perform functions on data stored by the memory device and store the outputs of the functions on the memory device. Thus, data may be processed at the storage device level and the data does not move between the storage plane and the compute plane during execution of the function. Some accelerated memories 116 may include one or more processors each having one or more cores or other circuitry for performing functions requested by a function requester (e.g., 104). An accelerated memory 116 may be considered a memory element 110 as well as a compute element 108.

A smart NIC 118 may comprise a NIC that includes processing abilities enabling the smart NIC to perform functions on data that passes through the NIC. Some smart NICs 118 may include one or more processors each having one or more cores or other circuitry for performing functions requested by a function requester (e.g., 104). Example functions that are generally performed by a smart NIC may include networking data plane functions such as match-action processing, tunnel termination and origination, or per-flow statistics, although a smart NIC may be configured to perform any suitable functions. A smart NIC 118 may also perform any suitable conventional NIC functions. For example, a smart NIC 118 may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A smart NIC may include one or more physical ports that may couple to a cable (e.g., an Ethernet cable).

The compute elements may be arranged on the platform 102 in any suitable manner. For example, two different compute elements may be on separate chips or devices, on separate dies in the same package, or on the same die in some instances. In various embodiments, components of a platform 102 may reside on a circuit board (or multiple circuit boards) or other device that is installed in a chassis, rack, or other suitable structure that may in some embodiments comprise multiple platforms coupled together through a network (which may comprise, e.g., a rack or backplane switch).

In the embodiment depicted, interconnects 112 include intra-element interconnects 124, inter-element interconnects 126, and memory-element interconnects 128.

An intra-element interconnect 124 may include an interconnect within a particular compute element. For example, an intra-element interconnect 124 may include an on-die interconnect (e.g., that connects a memory agent of a compute element with one or more cores of the compute element).

An inter-element interconnect 126 may include an interconnect coupling a compute element 108 to another compute element 108 (or interconnect forming a portion of a path between compute elements). Such interconnects may include, e.g., Intel® Ultra Path Interconnect (UPI), Intel® Accelerator Link (IAL), Compute Express Link (CXL), Peripheral Component Interconnect Express (PCIe), Ethernet, OpenCAPI™, Gen-Z™, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

A memory-element interconnect 128 may include an interconnect coupling a compute element 108 to a memory element 110 (or interconnect that interfaces with a memory element 110 and forms a first portion of a path between a memory element 110 and a compute element 108). Such interconnects may include, e.g., any of the inter-element interconnect types described above that are also adapted to couple to a memory 110. Other example, memory-element interconnects include Intel® Scalable Memory Interface 2 (SMI2) or a SATA based link, among others.

Memory elements 110 may comprise any form of volatile or non-volatile memories including, without limitation, magnetic media (e.g., one or more tape drives), optical media, random access memory (RAM), read-only memory (ROM), flash memory, removable media, or any other suitable local or remote memory component or components. In the embodiment depicted, memory elements 110 comprise a memory element 120 compatible with a double data rate (DDR) interface and a memory element 122 compatible with a non-volatile memory express (NVMe) interface, although other embodiments may include any number of memory elements, memory elements compatible with any suitable type of memory interfaces, and memory elements having any suitable storage media type (e.g., dynamic random access memory (DRAM), static random access memory (SRAM), NAND flash memory, 3D crosspoint memory, etc.).

Memory elements 110 may be used for short, medium, and/or long term storage by platform 102. Memory elements 110 may store data that is operated on by compute elements 108 (e.g., inputs and outputs of functions performed by compute elements 108). In some embodiments, memory elements 110 may also comprise storage for instructions that may be executed by the compute elements 108 or other logic of the platform 102 or configuration information that may be used to configure a compute element 108 to perform a particular function in order to expose the function to a function requester 104.

Function requester 104 may be any suitable entity capable of requesting execution of a function by platform 102. In various embodiments, function requester 104 may run on platform 102 or on a different computing entity (e.g., a computing system coupled to the platform 102 via one or more networks). As various examples, function requester 104 may be or comprise an operating system, an application running on an operating system, a service, a workload, a guest system (such as a virtual machine or multiple virtual machines such as a virtual network function or service function chain), or other suitable computing entity.

In various embodiments, a function requester 104 or other entity associated with a function requester may be able to access a list of functions executable by the platform. In one example, platform 102 may include a plurality of model specific registers (MSRs) that include information indicating which functions may be executed by at least one compute element of the platform 102.

Figure 2:
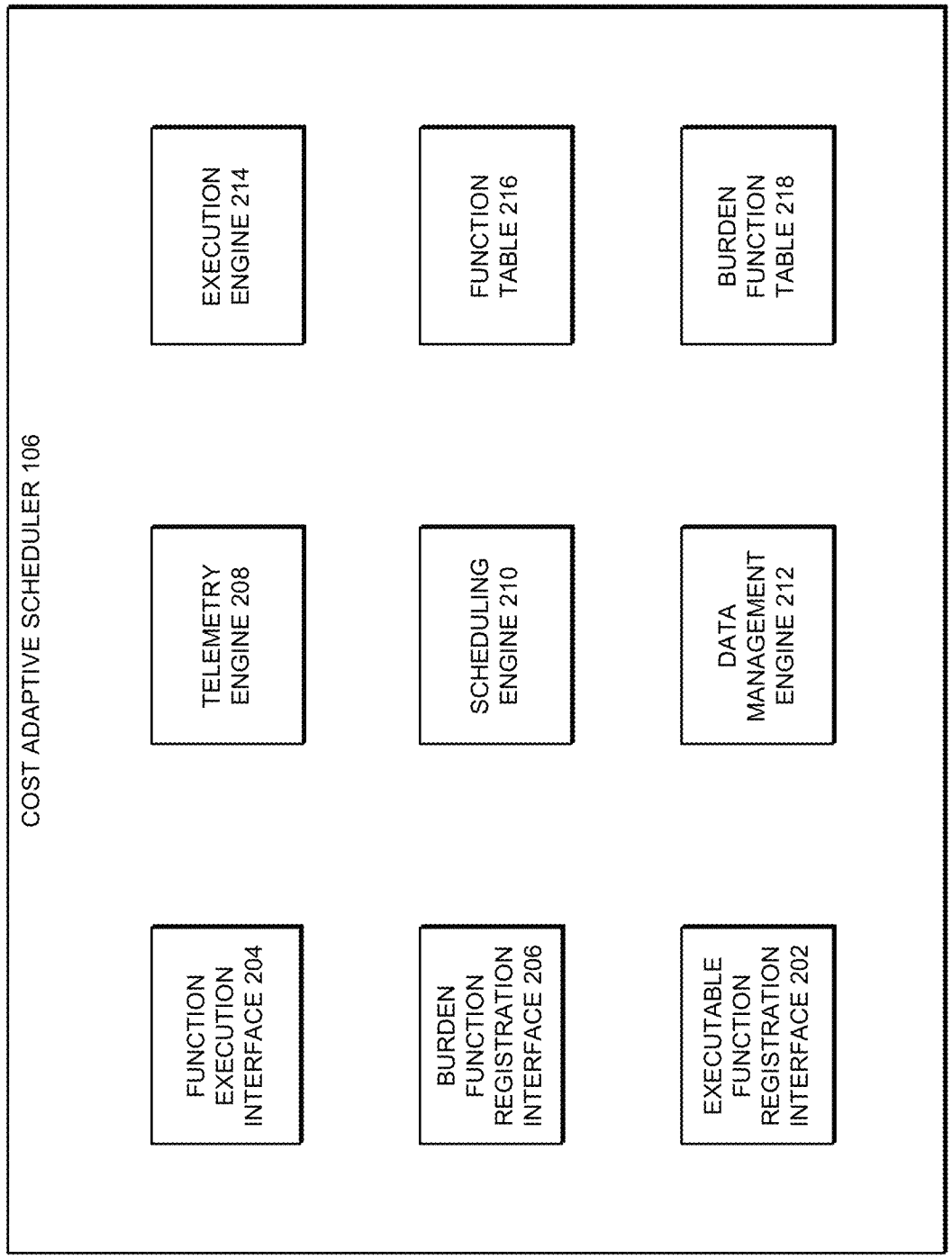
FIG. 2 illustrates a burden adaptive scheduler in accordance with certain embodiments.

FIG. 2 illustrates a burden adaptive scheduler 106 in accordance with certain embodiments. In the embodiment depicted, scheduler 106 comprises interfaces including executable function registration interface 202, function execution interface 204, and burden function registration interface 206. Schedule 106 also comprises telemetry engine 208, scheduling engine 210, data management engine 212, execution engine 214, function table 216, and burden function table 216. In a particular embodiment, the logic of the burden adaptive scheduler 106 may be integrated together on a chip, such as an application specific integrated circuit (ASIC), microcontroller, microprocessor, or other suitable hardware element or module. In various embodiments, the burden adaptive scheduler 106 may be on a separate chip from the compute elements 108 and memory elements 110 of the platform or may otherwise be discrete from these elements.

Executable function registration interface 202 includes logic suitable to receive function registration requests and store information associated with the requests in function table 216. Interface 202 may allow an entity to register the functions that may be executed by one or more compute elements 108 of the platform 102. In various embodiments, any suitable computing entity may send a function registration request. For example, a function requester 104 or an associated entity (e.g., a computing host that supports the function requester 104) or a management entity associated with the platform 102 may send the function registration request.

A function registration request may include any suitable information, e.g., one or more of a function ID that uniquely identifies the function, a category of the function, and one or more performance properties of the function. A category of the function may specify a particular type of the function. While any suitable categories may be specified, example categories may include cryptographic (this category could include, e.g., a function to encrypt or decrypt data), network processing, algebra vector (this category could include, e.g., a function to compute a Fast Fourier Transform), neural network (this category could include, e.g., a function to detect a person in an image), among many others. In some embodiments, the category value may provide an indication of the relative suitability of different types of compute elements for performing functions of that category. For example, a category value of neural network may indicate that a neural network processor may execute the function faster than a general purpose CPU. As another example, a category value of network processing may indicate that certain compute elements (e.g., CPUs, network processors, smart NICs) may be capable of performing functions of that category but other compute elements (e.g., accelerated memories) are not capable of performing functions of that category.

A performance property may indicate the resources that are expected to be required to perform the function. For example, a performance property may specify an execution time per unit of payload data input, a number of expected execution cycles per unit of payload data input, a number of operations (e.g., floating point operations) to be performed per unit of payload data input, or other suitable performance metric specifying a throughput of the function.

In particular embodiments, a performance property may specify a baseline performance property (e.g., a property that is associated with execution of the function by a theoretical or actual baseline compute element having a particular architecture). In various embodiments, for a particular function, performance properties for specific compute elements of the platform 102 may be computed based at least in part on a baseline performance property, e.g., based on the specifications (e.g., speed, capacity, etc.) of the compute elements 108 relative to specifications associated with the baseline compute element. For example, if a particular compute element 110 has four times the bandwidth of the compute element associated with the baseline performance properties, the particular compute element may be expected to complete the function in one fourth of the baseline execution time. In other embodiments, as an alternative or in addition to the baseline performance properties, the function registration requests may specify performance properties for specific compute elements (e.g., a particular model of a processor or accelerator) or specific types of compute elements (e.g., performance properties for general purpose CPUs having specifications within a particular range, performance properties for accelerated memories having specifications within a particular range, etc.).

In various embodiments, executable function registration interface 202 may store data received or derived from function registration requests in function table 216. For example, interface 202 may store function IDs, function categories, and performance properties of the function in function table 216.

Function execution interface 204 is an interface used by the function requester 104 to request the execution of a particular function. A request to execute a function may include any suitable information associated with the request, such as one or more of a function ID (which may correspond to a function ID registered in the function table 216), an execution requirement (e.g., an SLA which specifies an execution latency time), input data information such as a size of the input data and a memory address specifying the location of the input data, output data information such as an expected size of the output data and a memory address at which the output data is to be stored, and an identifier of a burden function to be used by the burden adaptive scheduler 106 during selection of the compute element 108 that will execute the function (in at least some instances, the platform 102 may determine the burden function to be used and thus the request may omit the identifier of the burden function). The memory addresses may point to locations within one or more memory elements 110. In some embodiments, the same burden function is used for all functions or all executions of a particular function and thus the burden function is not specified in an executable function request for that function. In other embodiments, different burden functions may be used during different executions of a particular function, and therefore the executable function request may include an identifier of the particular burden function to be used.

Burden function registration interface 206 includes logic suitable to receive burden function registration requests and store information associated with the requests in burden function table 218. Interface 206 may allow an entity to register one or more burden functions that may be used by burden adaptive scheduler 106 to determine which compute element 108 is to process an executable function. In various embodiments, any suitable computing entity may send a burden function registration request. For example, a function requester 104 or an associated entity (e.g., a computing host that supports the function requester 104) or a management entity associated with the platform 102 may send the burden function registration request.

A burden function registration request may include any suitable information, e.g., one or more of a burden function ID that uniquely identifies the burden function and a specification of the burden function. The burden function ID may correspond to the burden function ID that may be specified in a request to execute a function that is received by function execution interface 204. A specification of a burden function may include any suitable information that allows the burden adaptive scheduler 106 to apply the burden function to candidate compute elements (e.g., compute elements that are candidates to process an executable function) to select a compute resource for execution of a function. For example, the specification may include a binary, bit-stream, or any form of description that can be executed or otherwise used by the scheduling engine 210 in order to select a particular compute element 108 to execute a function. Any suitable execution attribute may be utilized in the burden function, such as an execution latency, a current or expected utilization of a candidate compute element 108 and/or associated interconnects 112, a power usage of a candidate compute element 108 and/or associated interconnects, or a wear amount for a candidate compute element 108 (e.g., some compute elements may have a limited lifespan or may degrade in performance over time while other compute elements are immune to increased usage, thus a wear amount may indicate an amount of wear that execution of a function may inflict on particular compute elements), among others.

A burden function may utilize the execution attributes in any suitable manner. For example, a burden function may specify that the compute element 108 that maximizes or minimizes a particular execution attribute should be selected. As another example, a specification may include factor weights for one or more execution attributes and the burden function may be realized by fusing these factor weights together with metrics for the associated execution attributes to determine an output value for each compute element 108 under consideration (and the output values may then be ranked during the selection of the compute element for a particular function). As another example, a specification may specify thresholds for one or more execution attributes that dictate selection (or non-selection) of a particular compute element 108. For example, if usage of a compute element would result in an execution latency that is above a maximum execution time specified by a burden function, the compute element may be passed over in favor of a different compute element). The thresholds may be static (e.g., a specific power usage per unit of payload data) or dynamic (e.g., specified in the function call itself, such as in the case of a maximum execution time specified by a burden function). In yet another example, combinations of the above may be specified by a burden function. For example, a burden function may specify that once a particular threshold for one execution attribute is met (e.g., execution time), another execution attribute (e.g., power usage)

should be optimized. Other examples of burden functions will be described below in connection with the scheduling engine 210.

Telemetry engine 208 is operable to process telemetry data from the compute elements 108 and the interconnects 112 and provide telemetry indicators based on the telemetry data to the scheduling engine 210 for use in selection of resources to be used to execute requested functions.

Any suitable telemetry data and telemetry indicators are contemplated by the present disclosure. For example, the telemetry data or indicators may include a current utilization of any aspect of a compute element 108 or interconnect 112, e.g., usage or available amount of internal memory (e.g., cache memory or buffers), processing resources, or I/O bandwidth of the compute element or interconnect 112. As another example, the telemetry data or indicators may include an expected utilization of any aspect of a compute element 108 or interconnect 112 (e.g., an expected bandwidth of the compute element or interconnect at the time the data of the function is to reach the compute element for execution or to traverse the interconnect—e.g., in some embodiments, the expected utilization may take queued and ongoing functions into account to predict the utilization at a particular time in the future). In other examples, the telemetry data or indicators may include current or expected health information of a compute element 108 or interconnect 112, such as an indication of whether the resource is available, whether the resource is overloaded, or one or more temperatures, currents, voltages, or other health indicators associated with the resource.

Scheduling engine 210 is operable to select a compute element 108 to process an executable function when the function execution interface 204 is called by function requester 104. In determining the compute element 108, the scheduling engine 210 may utilize one or more of the information included in the function request, telemetry indicators provided by the telemetry processing engine 210, information in the function table 216, or information in the burden function table 216.

When a function is requested, scheduling engine 210 may determine which compute elements 108 expose access to the requested function (e.g., which compute elements 108 are currently configured to execute the function and are available to execute the function). In some embodiments, scheduling engine 210 may also determine which compute elements 108 are capable of executing the function but are not currently configured to execute the function (e.g., an instance of the function has not been instantiated on the compute element). In some embodiments, scheduling engine 210 may make such a determination after a determination that none of the compute elements which are currently configured to execute the function are able to meet one or more performance requirements for the function (to be described in more detail below).

The scheduling engine 210 may also determine a burden function that is to govern selection of the compute element 108. In some embodiments, the same burden function may be used for all functions (e.g., the burden function may simply specify that the compute element 108 that will result in the lowest execution latency or power should be selected). In other embodiments, different burden functions may be used for different executable functions or for different instances of the same executable function. In some scenarios, scheduling engine 210 may access information sent with the requested function to determine the burden function to use. For example, in some instances, the function call itself may specify the burden function to use or an identifier of the burden function to use (such that the scheduling engine 210 may then access burden function table 216 to determine the burden function). In some embodiments, the burden function may be associated with the function in any other suitable manner (e.g., the association may be made independent of the function call). In some embodiments, the function call may specify the ID of the function to be executed and the scheduling engine 210 may access function table 216 based on this function ID to determine which burden function to use.

After determining the burden function to use, the scheduling engine 210 may compute a result of the burden function for each compute element that exposes access to the requested function and select a compute element 108 based on the results.

In various embodiments, the burden function is based at least in part on an expected execution time of the function. This execution time includes the amount of time the compute element 108 is expected to take to perform the function as well as the amount of time to move the input data of the function from its location on the platform 102 (e.g., in one of the memory elements 110) to the compute element 108 and the amount of time to move the output data of the function to its destination (e.g., in one of the memory elements 110).

When calculating the expected execution time of a function for a particular compute element 108, the interconnects 112 through which the input data will pass as the data is traversed from its current location to the particular compute element 108 are identified. This may include one or more memory-element interconnects 128, inter-element interconnects 126, and/or intra-element interconnects 124.

Figure 3:
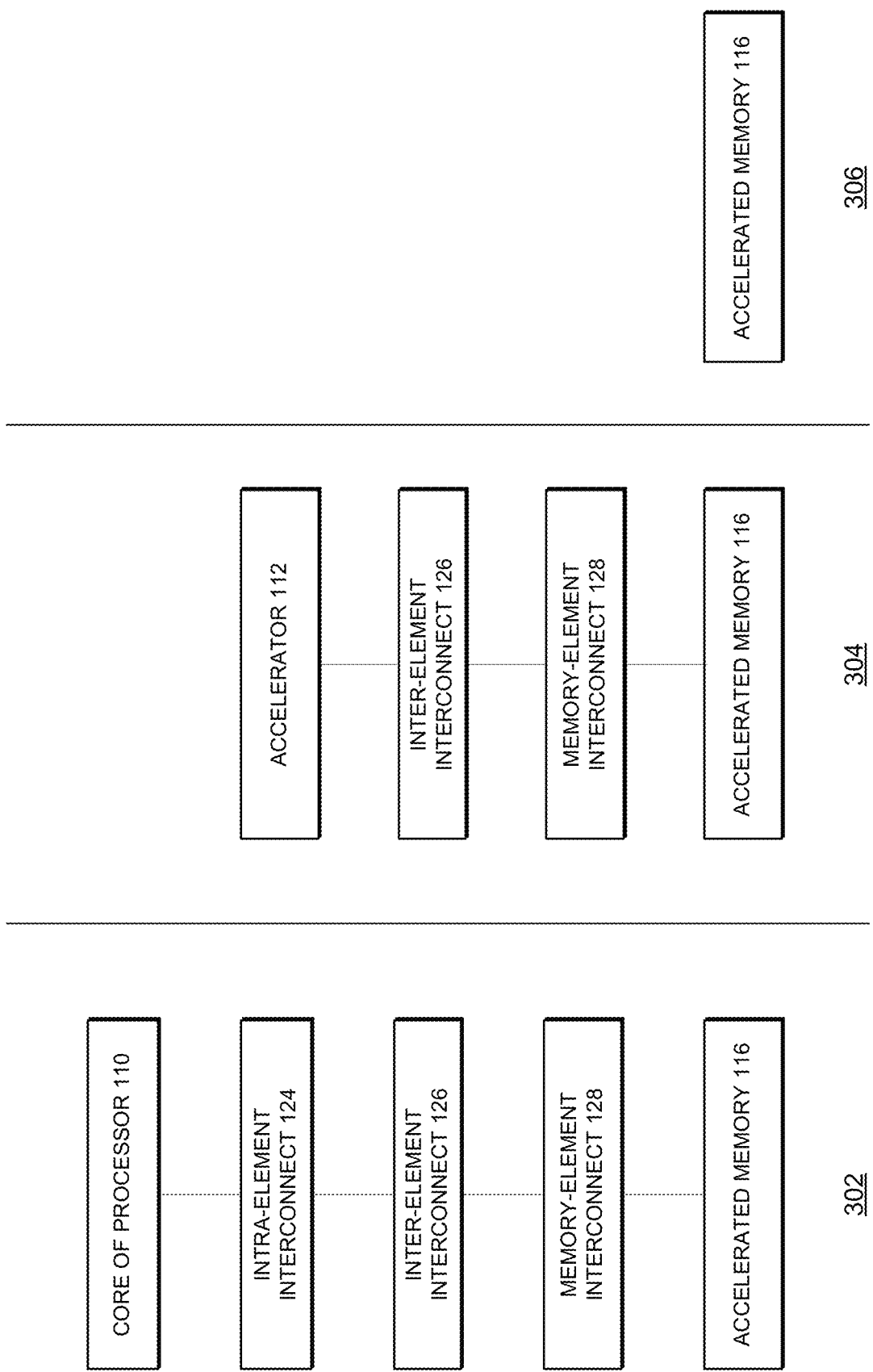
FIG. 3 illustrates example data shipment options in accordance with certain embodiments.

FIG. 3 illustrates example options for data shipment in accordance with certain embodiments. In these options, the location of the input data and the destination of the output data is an accelerated memory 116. In a first option 302, the candidate compute element is a processor 110 (e.g., a CPU). In this scenario, the interconnects may include, e.g., a memory-element interconnect 182A (e.g., a CXL interconnect), an inter-element interconnect 126 (e.g., a UPI interconnect), and an intra-element interconnect 124 (e.g., an on-die interconnect) of the processor 110 to provide a path for the input data to travel from the accelerated memory 116 to a core of the processor 110 and back to the accelerated memory. In a second option 304, the candidate compute element is an accelerator 112. In this scenario, the interconnects may include, e.g., a memory-element interconnect 128 (such as a first PCIe link) and an inter-element interconnect 126 (e.g., a second PCIe link). In a third candidate scenario 306, the candidate compute element is the accelerated memory 116. Thus, no interconnects are shown as the function may be computed directly by the accelerated memory 116.

As another example (although not shown), if the compute element is an FPGA 114 and the location of the input data and destination of the output data is a memory element 110, the interconnects may include, e.g., one or more PCIe interconnects.

If the memory element 110 that will store the output data of the function is different from a memory element 110 that stores the input data, then two sets of interconnects may be determined (a first set to transport the input data to the compute element 108 and a second set to transport the output data from the compute element 108 to the destination).

For each interconnect 112 identified for a particular candidate compute element 108, the time to transport the data through the interconnect may be calculated based on the amount of the data to be transported (which may be specified by the executable function call or ascertained in any other suitable manner) and the available bandwidth (e.g., current or prospective) of the interconnect (which may be ascertained by telemetry indicators). In some instances (e.g., where the memory element which holds the input data is also used to hold the output data, the output data is expected to have a size that is equal to or substantially similar to the size of the input data, and the bandwidth of the interconnects are not expected to change between the transport to the compute element and the transport from the compute element), the expected transport time through the one or more interconnects to the compute element is simply doubled to determine a total expected data movement time and no additional calculations are made for the transport time for the output data. However, if the transport time for the input data and the transport time for the output data are not expected to be equal (e.g., when any of the previously mentioned assumptions are not true), an additional transport time is calculated for the output data and added to the transport time calculated for the input data to determine a total expected data movement time.

The expected execution time for the candidate compute element 108 is also determined, based, e.g., on the current or expected utilization of the compute element (e.g., available bandwidth) and one or more performance properties of the function (e.g., throughput required for the function). The expected execution time may also be based on the size of the input data. Thus, if the size of the input data is variable for a particular function (e.g., the size can change from one function call to the next), the execution times may be adjusted from one function call to the next if the execution time is expected to be different (e.g., longer for a larger input data size).

In some embodiments, when determining an expected execution time for a candidate compute element 108, a baseline performance property (e.g., execution time) may be adjusted based on the particular candidate compute element's properties. For example, if the candidate compute element is expected to perform the function faster (e.g., because the candidate compute element has faster processing capabilities) than a baseline architecture, then the expected execution time may be shortened accordingly. In some embodiments, the adjustment of the baseline performance property may be based on a category of the function. For example, if a particular candidate compute element is not particularly suited for a certain category of functions and the baseline performance property is execution time, the execution time may be increased accordingly. In some embodiments, the adjustment may be based on an adjustment factor which may be specified and stored (e.g., in function table 216) prior to reception of the request or may be calculated dynamically responsive to reception of the request.

The total expected execution time for a candidate compute element 108 is computed by adding the amount of time expected for the input and output data to travel through interconnects 112 to and from the candidate compute element 108 and for the candidate compute element 108 to perform the requested function. This computation may be performed for each candidate compute element.

In a particular embodiment, when a function request is associated with (e.g., accompanied by) a maximum execution time (e.g., as specified by an SLA), the total expected execution times for the various compute elements may be compared against the maximum execution time and any candidate compute elements 108 that have total expected execution times that are greater than the maximum execution time may be filtered out from the selection process.

In various embodiments, the burden function evaluated by the scheduling engine 210 may specify any other requirements that may result in the filtering out of one or more candidate compute elements 108. For example, the burden function may specify a maximum power usage (e.g., for the interconnects 112, the compute element 108, or the combination thereof) and if selection of a particular compute element would result in power usage exceeding the maximum, then that compute element may be filtered out from the selection process. As another example, a burden function may specify that a candidate compute element that has a utilization higher than a threshold should be filtered out or a candidate compute element that would result in usage of an interconnect with a utilization higher than a threshold should be filtered out.

In some embodiments, if all of the candidate compute elements evaluated are filtered out, the scheduling engine 210 may determine one or more additional candidate compute elements 108 that are capable of executing the requested function, but are not currently configured to execute the requested function. The scheduling engine 210 may then execute the burden function for each of these additional candidate compute elements 108 to determine if any of the additional candidate compute elements 108 can meet the constraints (and if so, one of the additional candidate compute elements 108 is selected to perform the function). If no compute elements are able to meet the constraints of the function, an error may be returned or the compute element 108 that provides a result that is closest to meeting the constraints may be selected to perform the function.

In some embodiments, an expected time to configure the candidate compute element 108 to execute the function may be added to the total expected time of execution when an additional candidate compute element 108 is evaluated. For example, the configuration may include reprogramming gate arrays of a compute element (e.g., FPGA 114) writing instruction logic to memory registers of a processor 110, or other suitable configuration operations. This aggregate expected execution time may be compared against the time constraint to determine if the additional candidate compute element 108 can meet the SLA requirement before the compute element is actually configured to perform the function.

In various embodiments, a burden function may seek to optimize system utilization. For example, the burden function may optimize power usage, wear, utilization of system resources, or other suitable characteristics of platform 102. In various embodiments, a burden function may consider optimizations in conjunction with expected execution time. For example, in some instances, optimizations may be performed only with respect to compute elements that, e.g., achieve an expected execution time that is less than a specified execution time for the function and/or that achieve an expected power usage that is less than a specified power usage associated with the function. For example, a burden function may specify that for each candidate compute element that meets the specified execution time, the candidate compute element that has the lowest utilization is to be selected to perform the function (or a load balancing algorithm may be utilized to distribute function executions across the candidate compute elements over multiple iterations of the function). As another example, a burden function may specify that for each candidate compute element that meets the specified execution time, the candidate compute element that results in the lowest power usage is to be selected to perform the function.

In some embodiments, a burden function may reference one or more particular types of compute elements. For example, a burden function may specify that if data resides at an accelerated memory (e.g., 116A), that a determination of the power to move the data to a candidate compute element and to execute the function at that compute element is to be made and if the power is more than a threshold amount (or if the difference in power between executing by the candidate compute element and executing by the accelerated memory (e.g., 116A) is greater than a specified threshold), then the function should be executed by the accelerated memory instead of the candidate compute element.

Upon selection of a compute element 108 to execute the function, scheduling engine 210 may coordinate with data management engine 212 and execution engine 214 to manage the movement of the input data from the memory element to the selected compute element, the execution of the function, and the movement of the output data to the destination.

Function table 216 and burden function table 218 may comprise any suitable data structures stored in any suitable type of memory, including any of those described herein.

Figure 4:
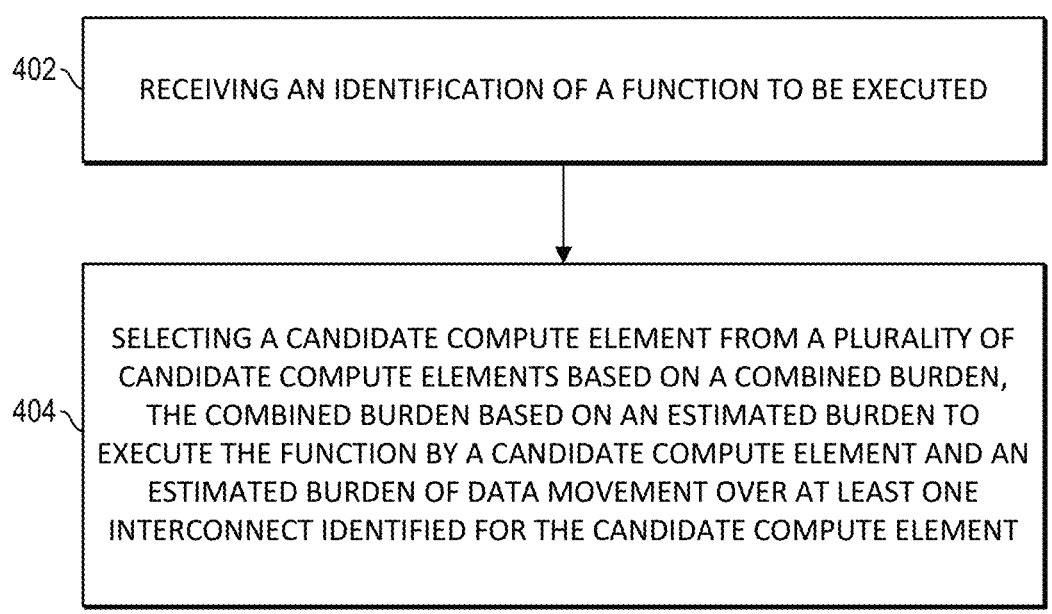
FIG. 4 illustrates a flow for adaptive data shipment in accordance with certain embodiments.

FIG. 4 illustrates a flow for adaptive data shipment in accordance with certain embodiments. The flow may be performed by burden adaptive scheduler 106 or other suitable computing logic.

402 comprises receiving an identification of a function to be executed. 404 comprises selecting a candidate compute element from a plurality of candidate compute elements based on a combined burden, the combined burden based on an estimated burden to execute the function by a candidate compute element and an estimated burden of data movement over at least one interconnect identified for the candidate compute element.

Some of the operations illustrated in FIG. 4 may be repeated, combined, modified or deleted where appropriate, and additional steps may also be added to the flowchart. Additionally, steps may be performed in any suitable order without departing from the scope of particular embodiments.

The following FIGs. depict systems and components that may be used in conjunction with the embodiments described above. For example, the systems depicted in the following FIGs. or portions thereof may be included within platform 102. As another example, the components depicted therein (e.g., processor 510, graphics 540, accelerators 542, network interface 550, I/O interface 560, memory subsystem 520, peripheral interface 570, storage subsystem 580, racks 602, sleds 604, or any of the other components depicted in FIGS. 5-9) may be compute elements 108 or any of the interconnects between such components may be interconnects 112.

Figure 5:
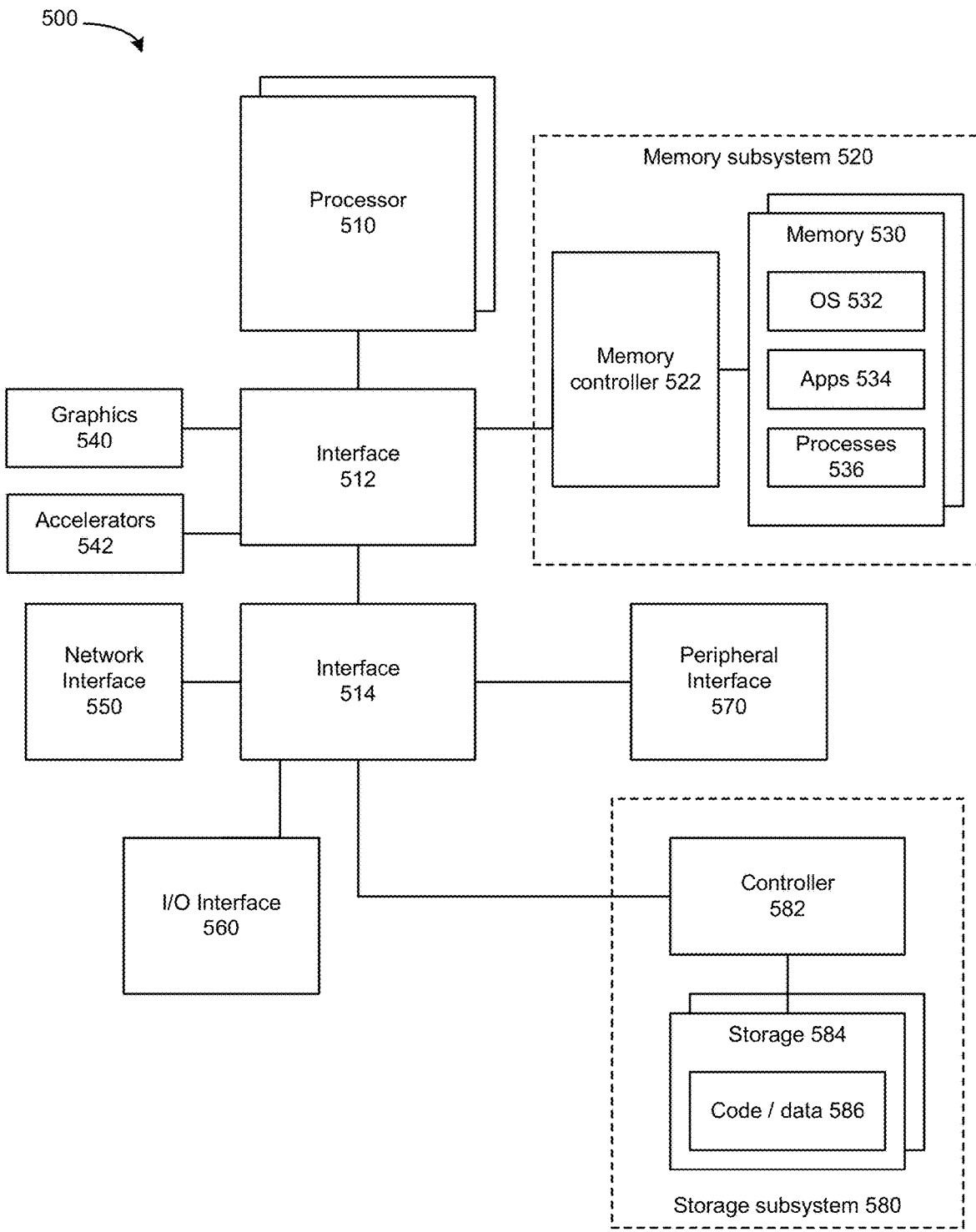
FIG. 5 depicts a system in accordance with certain embodiments.

FIG. 5 depicts an example system. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions.

Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (i.e., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDRS (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 6:
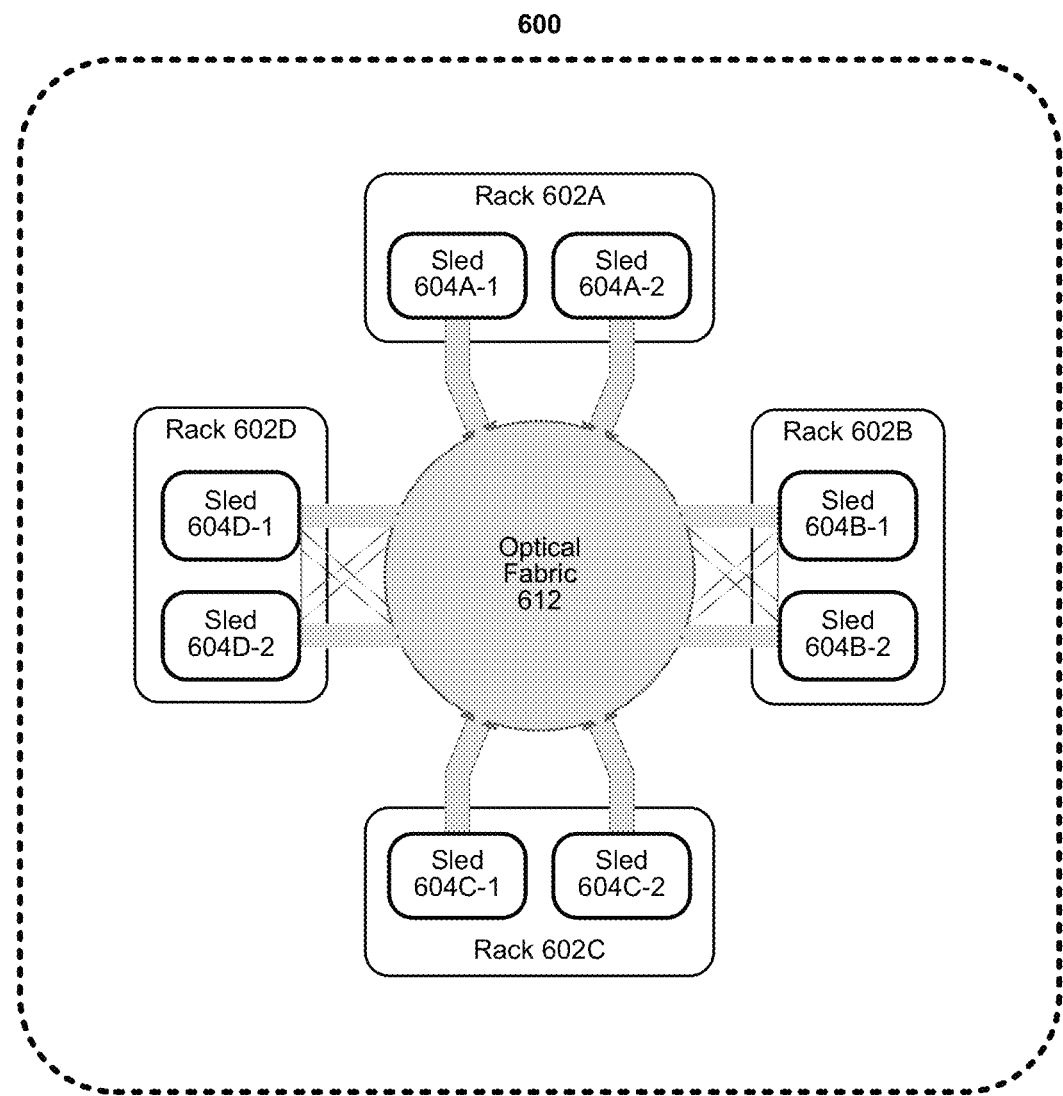
FIG. 6 depicts a system in accordance with certain embodiments.

FIG. 6 depicts an example of a data center. As shown in FIG. 6, data center 600 may include an optical fabric 612. Optical fabric 612 may generally include a combination of optical signaling media (such as optical cabling) and optical switching infrastructure via which any particular sled in data center 600 can send signals to (and receive signals from) each of the other sleds in data center 600. The signaling connectivity that optical fabric 612 provides to any given sled may include connectivity both to other sleds in a same rack and sleds in other racks. Data center 600 includes four racks 602A to 602D and racks 602A to 602D house respective pairs of sleds 604A-1 and 604A-2, 604B-1 and 604B-2, 604C-1 and 604C-2, and 604D-1 and 604D-2. Thus, in this example, data center 600 includes a total of eight sleds. Optical fabric 612 can provide each sled signaling connectivity with one or more of the seven other sleds. For example, via optical fabric 612, sled 604A-1 in rack 602A may possess signaling connectivity with sled 604A-2 in rack 602A, as well as the six other sleds 604B-1, 604B-2, 604C-1, 604C-2, 604D-1, and 604D-2 that are distributed among the other racks 602B, 602C, and 602D of data center 600. The embodiments are not limited to this example.

Figure 7:
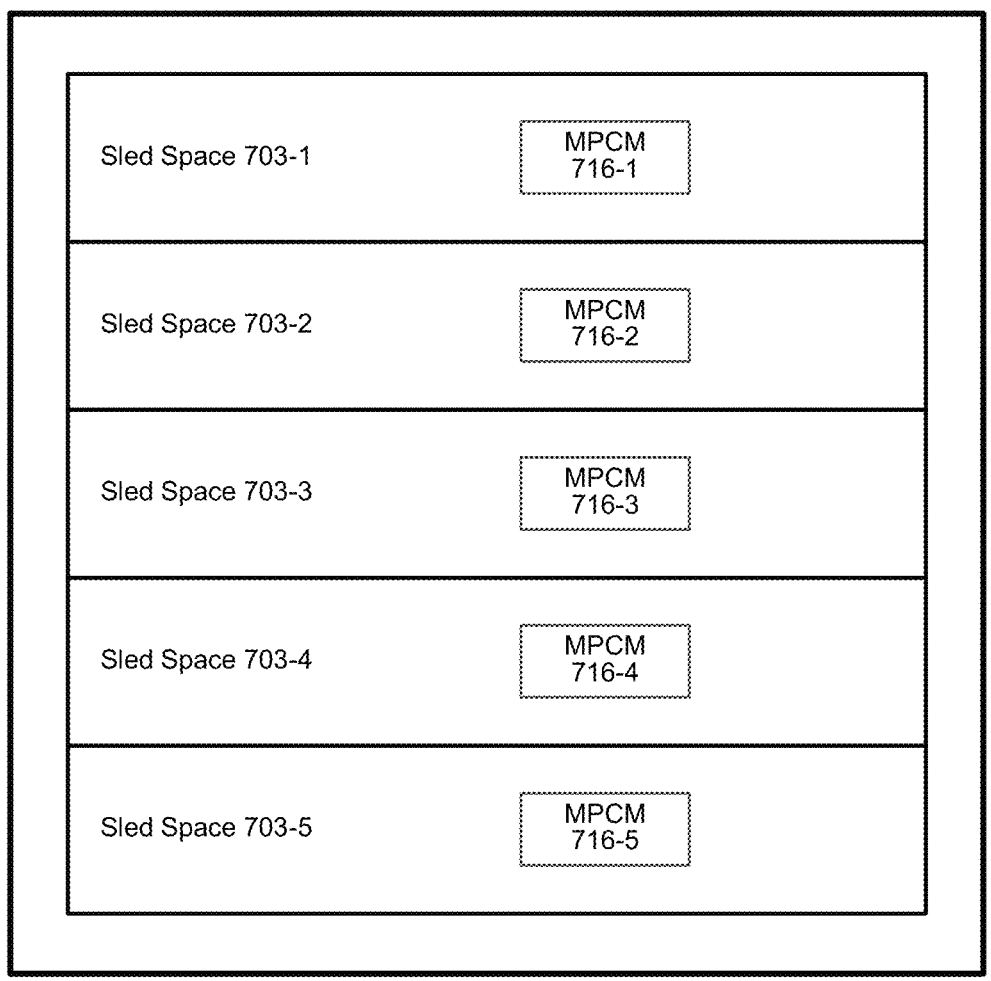
FIG. 7 depicts a system in accordance with certain embodiments.

FIG. 7 depicts a rack architecture such that a plurality of sled spaces can have sleds inserted. Sled spaces can be robotically-accessible via a rack access region 701. In the particular non-limiting example, rack architecture 700 features five sled spaces 703-1 to 703-5. Sled spaces 703-1 to 703-5 feature respective multi-purpose connector modules (MPCMs) 716-1 to 716-5.

Figure 8:
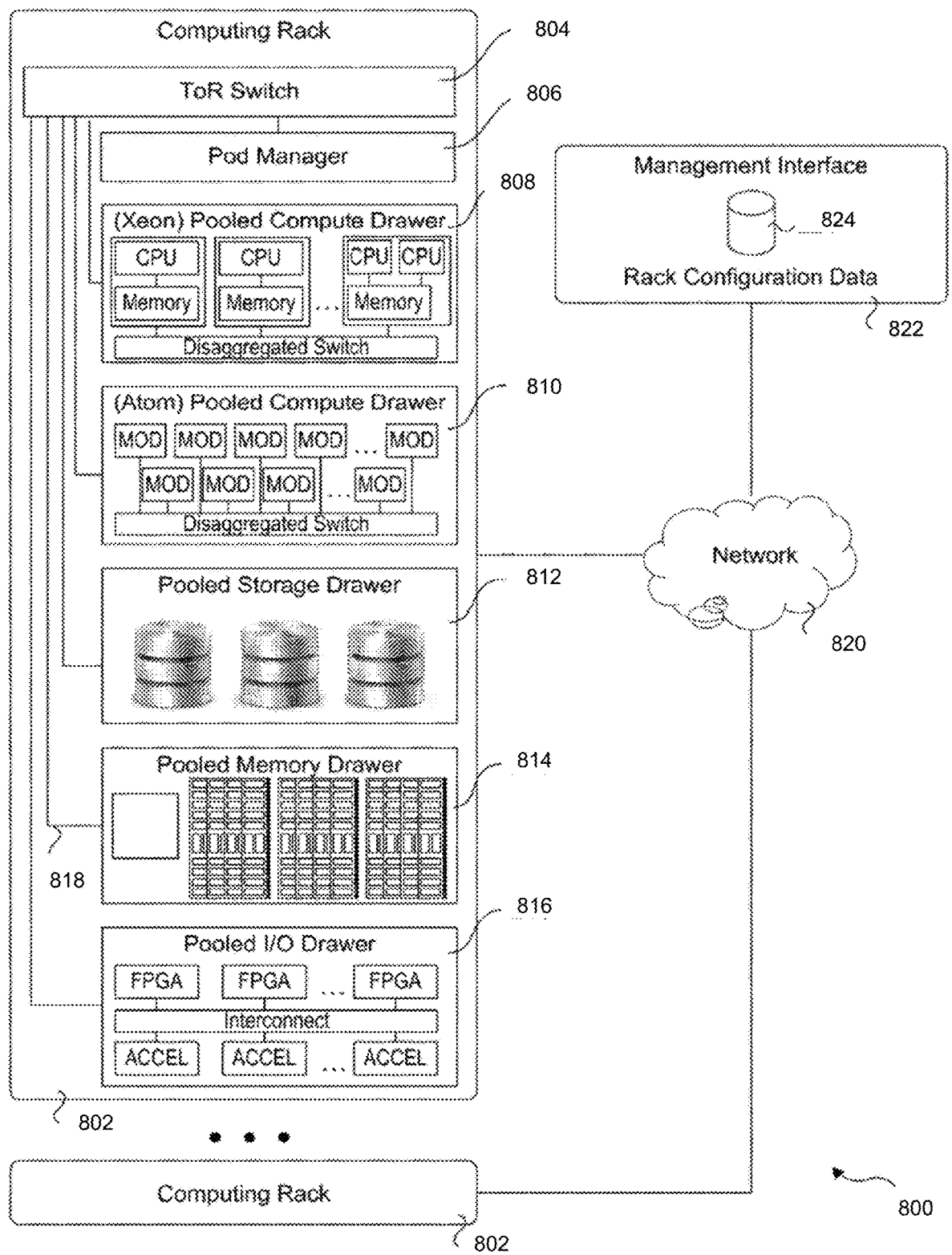
FIG. 8 depicts an example environment in accordance with certain embodiments.

FIG. 8 depicts an environment 800 includes multiple computing racks 802, each including a Top of Rack (ToR) switch 804, a pod manager 806, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+ Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

Figure 9:
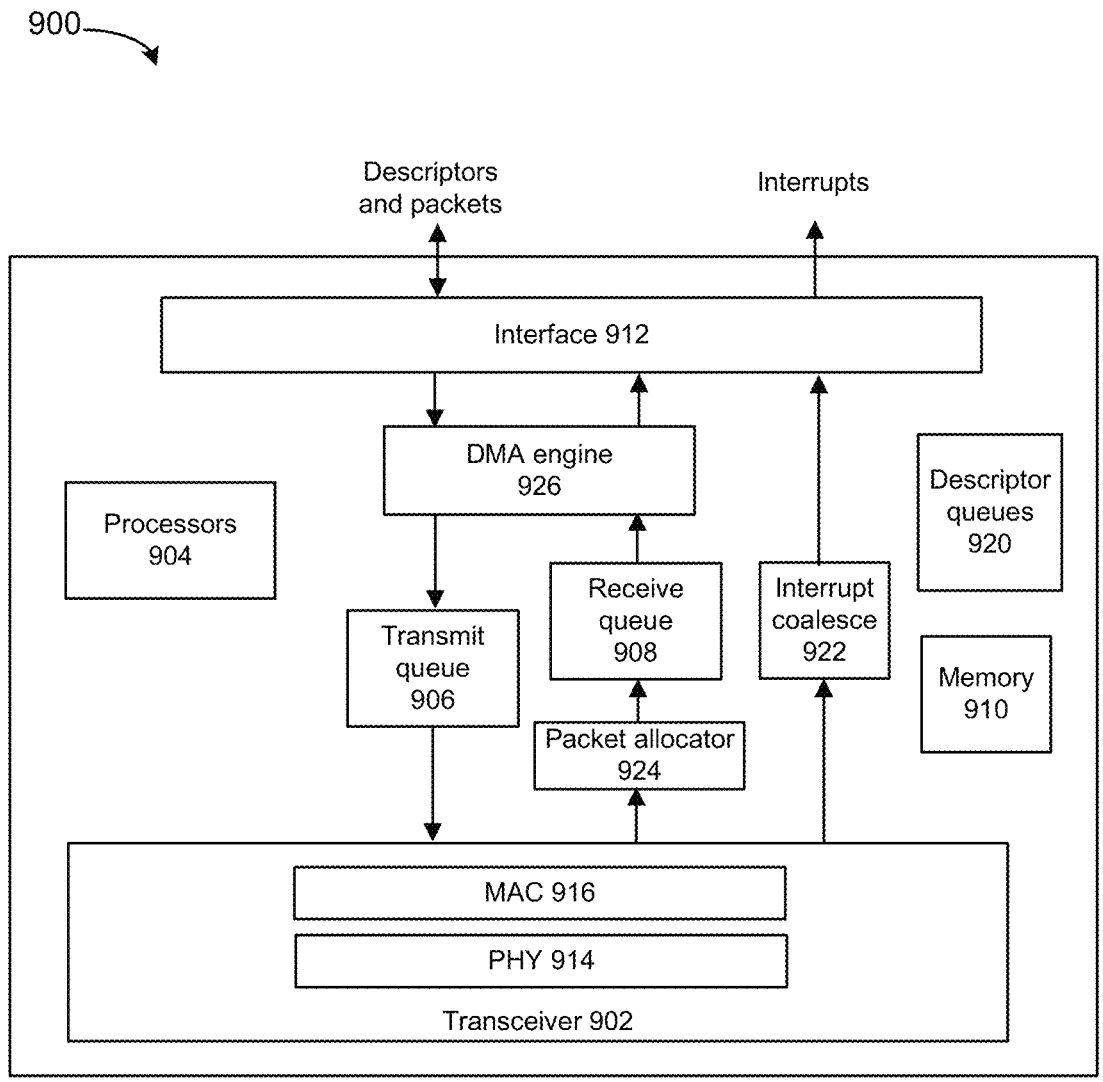
FIG. 9 depicts a network interface that can use embodiments or be used by embodiments.

FIG. 9 depicts a network interface that can use embodiments or be used by embodiments. Various processors of network interface 900 can use techniques described herein to provision operating parameters of a core of processors 904. For example, if a first core of processors 904 performs packet processing and a second core of processor 904 performs a power management process, the second core can modify operating parameters of the first core in accordance with embodiments described herein.

Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Any of the flows, methods, processes (or portions thereof) or functionality of any of the various components described herein or illustrated in the FIGs. may be performed by any suitable computing logic, such as one or more modules, engines, blocks, units, models, systems, interfaces, or other suitable computing logic. Reference herein to a "module", "engine", "block", "unit", "model", "system", "logic", or "interface" may refer to hardware, firmware, software and/or combinations of each to perform one or more functions. As an example, a module, engine, block, unit, model, system, logic, or interface may include one or more hardware components, such as a micro-controller or processor, associated with a non-transitory medium to store code adapted to be executed by the micro-controller or processor. Therefore, reference to a module, engine, block, unit, model, system, logic, or interface, in one embodiment, may refers to hardware, which is specifically configured to recognize and/or execute the code to be held on a non-transitory medium. Furthermore, in another embodiment, use of module, engine, block, unit, model, system, logic, or interface refers to the non-transitory medium including the code, which is specifically adapted to be executed by the microcontroller or processor to perform predetermined operations. And as can be inferred, in yet another embodiment, a module, engine, block, unit, model, system, logic, or interface may refer to the combination of the hardware and the non-transitory medium. In various embodiments, a module, engine, block, unit, model, system, logic, or interface may include a microprocessor or other processing element operable to execute software instructions, discrete logic such as an application specific integrated circuit ASIC, a programmed logic device such as a field programmable gate array FPGA, a memory device containing instructions, combinations of logic devices (e.g., as would be found on a printed circuit board), or other suitable hardware and/or software. A module, engine, block, unit, model, system, logic, or interface may include one or more gates or other circuit components, which may be implemented by, e.g., transistors. In some embodiments, a module, engine, block, unit, model, system, logic, or interface may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, logics, or interfaces) may share hardware, software, firmware, or a combination thereof, while potentially retaining some independent hardware, software, or firmware.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an interface to receive an identification of a function to be executed; and a scheduling engine comprising circuitry, the scheduling engine to select a candidate compute element from a plurality of candidate compute elements based on a combined burden, the combined burden based on an estimated burden to execute the function by the candidate compute element and an estimated burden of data movement over at least one interconnect identified for the candidate compute element.

Example 2 may include the subject matter of example 1, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

Example 3 may include the subject matter of example 2, wherein the first estimated time is based on a size of the input data and the second estimated time is based on a size of the output data.

Example 4 may include the subject matter of example 3, wherein the size of the input data is different from the size of the output data.

Example 5 may include the subject matter of any of examples 2-4, wherein the first estimated time and second estimated time are based on telemetry data indicating a utilization of the at least one interconnect identified for the candidate compute element.

Example 6 may include the subject matter of any of examples 1-5, the scheduling engine to estimate a data movement plus execution time for each of a plurality of candidate compute elements; and filter out one or more of the plurality of candidate compute elements that have an estimated data movement plus execution time that is greater than a maximum latency specified for the function.

Example 7 may include the subject matter of example 6, the scheduling engine to, responsive to a determination that each of a first set of candidate compute elements has an estimated data movement plus execution time that exceeds the maximum latency specified for the function, identify an additional candidate compute element that is capable of executing the function, but is not configured to execute the function; and responsive to a determination that the maximum latency is greater than an estimated data movement plus execution time for the additional candidate compute element plus an estimated time to configure the additional candidate compute element to perform the function select the additional candidate compute element to execute the function; and configure the additional candidate compute element to execute the function.

Example 8 may include the subject matter of any of examples 1-7, the estimated burden to execute the function by the candidate compute element is based on estimated power consumption for the candidate compute element to execute the function; and the estimated burden of data movement over the at least one interconnect identified for the candidate compute element is based on an estimated power consumption to send input data over the at least one interconnect to the candidate compute element and an estimated power consumption to send output data from the candidate compute element over the at least one interconnect.

Example 9 may include the subject matter of any of examples 1-8, wherein the scheduling engine is to utilize a first burden function specifying one or more criteria for estimating the combined burden; utilize a second burden function specifying one or more criteria for estimating a combined burden of executing a second requested function, wherein the one or more criteria of the second burden function is different from the one or more criteria of the first burden function; and select a second candidate compute element to execute the second requested function based on evaluation results of the second burden function.

Example 10 may include the subject matter of any of examples 1-9, wherein a first interconnect of the at least one interconnect identified for the candidate compute element comprises an interconnect coupled between the candidate compute element and a memory element storing input data for the function and a second interconnect of the at least one interconnect identified for the candidate compute element comprises an interconnect located within the candidate compute element.

Example 11 is a method comprising receiving an identification of a function to be executed; and selecting, by a scheduling engine comprising circuitry, a candidate compute element from a plurality of candidate compute elements based on a combined burden, the combined burden based on an estimated burden to execute the function by a candidate compute element and an estimated burden of data movement over at least one interconnect identified for the candidate compute element.

Example 12 may include the subject matter of example 11, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

Example 13 may include the subject matter of example 12, wherein the first estimated time is based on a size of the input data and the second estimated time is based on a size of the output data.

Example 14 may include the subject matter of example 13, wherein the size of the input data is different from the size of the output data.

Example 15 may include the subject matter of any of examples 12-14, wherein the first estimated time and second estimated time are based on telemetry data indicating a utilization of the at least one interconnect.

Example 16 may include the subject matter of any of examples 11-16, further comprising estimate a data movement plus execution time for each of a plurality of candidate compute elements; and filtering out one or more of the plurality of candidate compute elements that have an estimated data movement plus execution time that is greater than a maximum latency specified for the function.

Example 17 may include the subject matter of example 16, further comprising responsive to a determination that each of a first set of candidate compute elements has an estimated data movement plus execution time that exceeds the maximum latency specified for the function, identifying an additional candidate compute element that is capable of executing the function, but is not configured to execute the function; and responsive to a determination that the maximum latency is greater than an estimated data movement plus execution time for the additional candidate compute element plus an estimated time to configure the additional candidate compute element to perform the function, selecting the additional candidate compute element to execute the function; and configuring the additional candidate compute element to execute the function.

Example 18 may include the subject matter of any of examples 11-17, wherein the estimated burden to execute the function by the candidate compute element is based on estimated power consumption for the candidate compute element to execute the function; and the estimated burden of data movement over the at least one interconnect identified for the candidate compute element is based on an estimated power consumption to send input data over the at least one interconnect to the candidate compute element and an estimated power consumption to send output data from the candidate compute element over the at least one interconnect.

Example 19 may include the subject matter of any of examples 11-18, further comprising utilizing a first burden function specifying one or more criteria for estimating the combined burden; utilizing a second burden function specifying one or more criteria for estimating a combined burden of executing a second requested function, wherein the one or more criteria of the second burden function is different from the one or more criteria of the first burden function; and selecting a second candidate compute element to execute the second requested function based on evaluation results of the second burden function.

Example 20 may include the subject matter of any of examples 11-19, wherein a first interconnect of the at least one interconnect identified for the candidate compute element comprises an interconnect coupled between the candidate compute element and a memory element storing input data for the function and a second interconnect of the at least one interconnect identified for the candidate compute element comprises an interconnect located within the candidate compute element.

Example 21 is a system comprising a plurality of memory elements comprising a first memory element to store input data of a requested function and output data of the requested function; a plurality of candidate compute elements operable to execute the requested function; and a scheduling engine comprising circuitry, the scheduling engine to select a candidate compute element from the plurality of candidate compute elements based on a combined burden, the combined burden based on an estimated burden to execute the function by the candidate compute element, an estimated burden of data movement of the input data from the first memory element over at least one interconnect identified for the candidate compute element, and an estimated burden of data movement of the output data over the at least one interconnect to the first memory.

Example 22 may include the subject matter of example 21, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

Example 23 may include the subject matter of example 22, wherein the first estimated time is based on a size of the input data and the second estimated time is based on a size of the output data.

Example 24 may include the subject matter of example 23, wherein the size of the input data is different from the size of the output data.

Example 25 may include the subject matter of any of examples 22-24, wherein the first estimated time and second estimated time are based on telemetry data indicating a utilization of the at least one interconnect identified for the candidate compute element.

Example 26 may include the subject matter of example 22, the scheduling engine to estimate a data movement plus execution time for each of a plurality of candidate compute elements; and filter out one or more of the plurality of candidate compute elements that have an estimated data movement plus execution time that is greater than a maximum latency specified for the function.

Example 27 may include the subject matter of example 26, the scheduling engine to, responsive to a determination that each of a first set of candidate compute elements has an estimated data movement plus execution time that exceeds the maximum latency specified for the function, identify an additional candidate compute element that is capable of executing the function, but is not configured to execute the function; and responsive to a determination that the maximum latency is greater than an estimated data movement plus execution time for the additional candidate compute element plus an estimated time to configure the additional candidate compute element to perform the function select the additional candidate compute element to execute the function; and configure the additional candidate compute element to execute the function.

Example 28 may include the subject matter of any of examples 21-27, the estimated burden to execute the function by the candidate compute element is based on estimated power consumption for the candidate compute element to execute the function; and the estimated burden of data movement over the at least one interconnect identified for the candidate compute element is based on an estimated power consumption to send input data over the at least one interconnect to the candidate compute element and an estimated power consumption to send output data from the candidate compute element over the at least one interconnect.

Example 29 may include the subject matter of any of examples 21-28, wherein the scheduling engine is to utilize a first burden function specifying one or more criteria for estimating the combined burden; utilize a second burden function specifying one or more criteria for estimating a combined burden of executing a second requested function, wherein the one or more criteria of the second burden function is different from the one or more criteria of the first burden function; and select a second candidate compute element to execute the second requested function based on evaluation results of the second burden function.

Example 30 may include the subject matter of any of examples 21-29, wherein a first interconnect of the at least one interconnect identified for the candidate compute element comprises an interconnect coupled between the candidate compute element and a memory element storing input data for the function and a second interconnect of the at least one interconnect identified for the candidate compute element comprises an interconnect located within the candidate compute element.

Example 31 may include the subject matter of any of examples 21-30, wherein the first memory element comprises circuitry to execute the requested function and wherein selection of the candidate compute element further comprises evaluating the combined burden for the first memory element to determine whether the first memory element should be selected to execute the requested function.

Example 32 may include the subject matter of any of examples 21-31, wherein the plurality of candidate compute elements comprise a processor and at least one of an accelerator, a field programmable gate array, or an accelerated memory element.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
an interface to receive an identification of a function to be executed; and
a scheduling engine comprising circuitry, the scheduling engine to select a candidate compute element from a plurality of candidate compute elements based on a combined burden, the combined burden based on an estimated burden to execute the function by the candidate compute element and an estimated burden of data movement over at least one interconnect identified for the candidate compute element;
wherein a first interconnect of the at least one interconnect identified for the candidate compute element comprises an interconnect coupled between the candidate compute element and a memory element storing input data for the function and a second interconnect of the at least one interconnect identified for the candidate compute element comprises an interconnect located within the candidate compute element.

2. The apparatus of claim 1, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

3. The apparatus of claim 2, wherein the first estimated time is based on a size of the input data and the second estimated time is based on a size of the output data.

4. The apparatus of claim 3, wherein the size of the input data is different from the size of the output data.

5. The apparatus of claim 2, wherein the first estimated time and second estimated time are based on telemetry data indicating a utilization of the at least one interconnect identified for the candidate compute element.

6. The apparatus of claim 1, the scheduling engine to:
estimate a data movement plus execution time for each of a plurality of candidate compute elements; and
filter out one or more of the plurality of candidate compute elements that have an estimated data movement plus execution time that is greater than a maximum latency specified for the function.

7. The apparatus of claim 6, the scheduling engine to:
responsive to a determination that each of a first set of candidate compute elements has an estimated data movement plus execution time that exceeds the maximum latency specified for the function, identify an additional candidate compute element that is capable of executing the function, but is not configured to execute the function; and responsive to a determination that the maximum latency is greater than an estimated data movement plus execution time for the additional candidate compute element plus an estimated time to configure the additional candidate compute element to perform the function:
select the additional candidate compute element to execute the function; and
configure the additional candidate compute element to execute the function.

8. The apparatus of claim 1, wherein:
the estimated burden to execute the function by the candidate compute element is based on estimated power consumption for the candidate compute element to execute the function; and
the estimated burden of data movement over the at least one interconnect identified for the candidate compute element is based on an estimated power consumption to send input data over the at least one interconnect to the candidate compute element and an estimated power consumption to send output data from the candidate compute element over the at least one interconnect.

9. The apparatus of claim 1, wherein the scheduling engine is to:
utilize a first burden function specifying one or more criteria for estimating the combined burden;
utilize a second burden function specifying one or more criteria for estimating a combined burden of executing a second requested function, wherein the one or more criteria of the second burden function is different from the one or more criteria of the first burden function; and
select a second candidate compute element to execute the second requested function based on evaluation results of the second burden function.

10. The apparatus of claim 1, wherein a first interconnect of the at least one interconnect identified for the candidate compute element comprises an interconnect coupled between the candidate compute element and a memory element storing input data for the function and a second interconnect of the at least one interconnect identified for the candidate compute element comprises an interconnect located within the candidate compute element.

11. A method comprising:
receiving an identification of a function to be executed; and
selecting, by a scheduling engine comprising circuitry, a candidate compute element from a plurality of candidate compute elements based on a combined burden, the combined burden based on an estimated burden to execute the function by a candidate compute element and an estimated burden of data movement over at least one interconnect identified for the candidate compute element;
responsive to a determination that each of a first set of candidate compute elements has an estimated data movement plus execution time that exceeds a maximum latency specified for the function, identifying an additional candidate compute element that is capable of executing the function, but is not configured to execute the function; and
configuring the additional candidate compute element to execute the function.

12. The method of claim 11, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

13. The method of claim 12, wherein the first estimated time is based on a size of the input data and the second estimated time is based on a size of the output data.

14. The method of claim 12, wherein the first estimated time and second estimated time are based on telemetry data indicating a utilization of the at least one interconnect.

15. The method of claim 12, further comprising:
estimating a data movement plus execution time for each of a plurality of candidate compute elements; and
filtering out one or more of the plurality of candidate compute elements that have an estimated data movement plus execution time that is greater than a maximum latency specified for the function.

16. A system comprising:
a plurality of memory elements comprising a first memory element to store input data of a requested function and output data of the requested function;
a plurality of candidate compute elements operable to execute the requested function; and
a scheduling engine comprising circuitry, the scheduling engine to select a candidate compute element from the plurality of candidate compute elements based on a combined burden, the combined burden based on an estimated burden to execute the function by the candidate compute element, an estimated burden of data movement of the input data from the first memory element over at least one interconnect identified for the candidate compute element, and an estimated burden of data movement of the output data over the at least one interconnect to the first memory;
wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

17. The system of claim 16, wherein the first memory element comprises circuitry to execute the requested function and wherein selection of the candidate compute element further comprises evaluating the combined burden for the first memory element to determine whether the first memory element should be selected to execute the requested function.

18. The system of claim 16, wherein the estimated burden of data movement over the at least one interconnect identified for the candidate compute element is based on a first estimated time to send input data over the at least one interconnect to the candidate compute element and a second estimated time to send output data from the candidate compute element over the at least one interconnect.

19. The system of claim 18, wherein the first estimated time is based on a size of the input data and the second estimated time is based on a size of the output data.

20. The system of claim 16, wherein the plurality of candidate compute elements comprise a processor and at least one of an accelerator, a field programmable gate array, or an accelerated memory element.

* * * * *